United States Patent
Peel et al.

[11] 3,869,097
[45] Mar. 4, 1975

[54] WEBBING SLOT FOR SEAT BELT RETRACTOR HOUSING

[75] Inventors: Richard E. Peel, Farmington Hills; Arild O. Saethre, Troy, both of Mich.

[73] Assignee: Ford Motor Company, Dearborn, Mich.

[22] Filed: Jan. 4, 1974

[21] Appl. No.: 430,820

[52] U.S. Cl. ............ 242/107, 280/150 SB, 297/388
[51] Int. Cl. ............................................ B65h 25/48
[58] Field of Search ....... 242/107 R, 107 SB, 107.3, 242/107.4, 107.5, 107.6; 297/388, 385; 280/150 SB

[56] References Cited
UNITED STATES PATENTS

| | | | |
|---|---|---|---|
| 3,291,526 | 12/1966 | Nicholas | 297/388 |
| 3,455,603 | 2/1969 | Nicholas | 280/150 SB X |
| 3,811,703 | 5/1974 | Turkovich | 280/150 SB |

*Primary Examiner*—Edward J. McCarthy
*Attorney, Agent, or Firm*—John J. Roethel; Keith L. Zerschling

[57] ABSTRACT

A seat belt retractor housing having in a wall an elongated slot through which webbing of a seat belt segment coupled to a retractor within the housing may be protracted and retracted. The slot has appended thereto webbing anti-twist means operative to inhibit twisting of the webbing caused by the tendency of the latter to shift laterally of the slot as it is protracted and retracted.

6 Claims, 5 Drawing Figures

PATENTED MAR 4 1975 3,869,097

WEBBING SLOT FOR SEAT BELT RETRACTOR HOUSING

BACKGROUND OF THE INVENTION

Current vehicle seat belt systems utilize retractor or reel mechanisms for retracting segments of the lap and shoulder harness belts when not in passenger restraint usage. U.S. Pat. No. 3,659,801 issued May 2, 1972 to Louis Romanzi, Jr. for a "Seat Belt Retractor Cover" discloses a typical cover for a seat belt retractor, which cover serves to protect the working parts of the retractor.

The top side portion of the retractor cover includes an elongated slot through which the webbing of the belt passes as it is protracted and retracted. If the retractor is a vehicle floor mounted mechanism as shown in the Romanzi patent, the reel is inclined to the plane of the floor at an angle normal to the direction of pull on the webbing when worn by a seat occupant. During the process of buckling the belt, the natural tendency of a seat occupant is to pull the belt segment in a direction somewhere between the angle normal to the reel axis and an angle vertical to the plane of the vehicle floor. This causes a lateral shift of the belt segment as it is unreeled. The belt then has a tendency to longitudinally twist or coil about itself as it is protracted. Upon retraction the twisted belt frequently jams in the retractor housing slot preventing complete retraction.

It is an object of the present invention to provide a retractor housing embodying belt anti-twist control means adapted to prevent twisting or coiling of the belt to the extent that it will jam in the retractor housing opening.

SUMMARY OF THE INVENTION

The seat belt retractor housing embodying the present invention has in a wall an elongated slot through which webbing of a seat belt segment coupled to a retractor within the housing may be protracted and retracted. The width of the slot in a direction normal to the elongation of the slot is slightly greater than the webbing thickness, the width of the slot preferably not exceeding three times the thickness of the webbing. The slot has a webbing anti-twist control means comprising at least one aperture appendaged to an end of the slot. The anti-twist control means aperture has an edge wall vertically intersecting a main edge of the slot and a rounded end wall spaced from the edge wall. The edge wall comprises a stop means preventing reverse entry of the webbing into the slot upon any lateral shift of the webbing causing the edge of the latter to coil upon itself upon the webbing engaging the rounded end wall as the webbing is protracted.

DESCRIPTION OF THE DRAWING

Further features and advantages of the present invention will be made more apparent as this description proceeds, reference being had to the accompanying drawing, wherein.

DETAILED DESCRIPTION OF THE INVENTION

Figure 1:
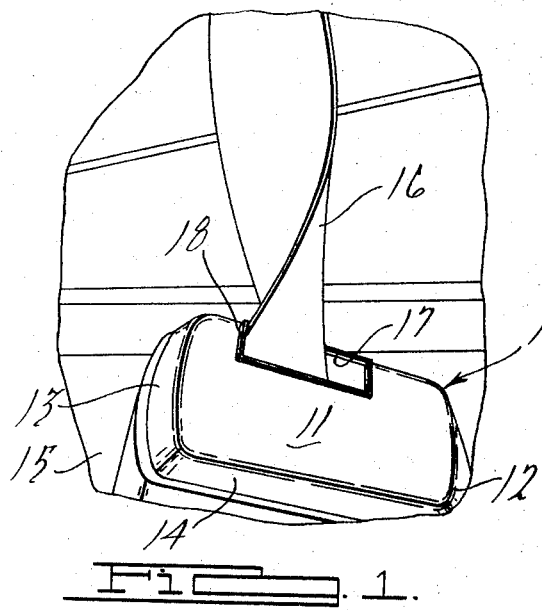
FIG. 1 is a perspective view of a current retractor housing and a webbing projecting therefrom showing the webbing twisted upon leaving the housing slot.
Figure 2:
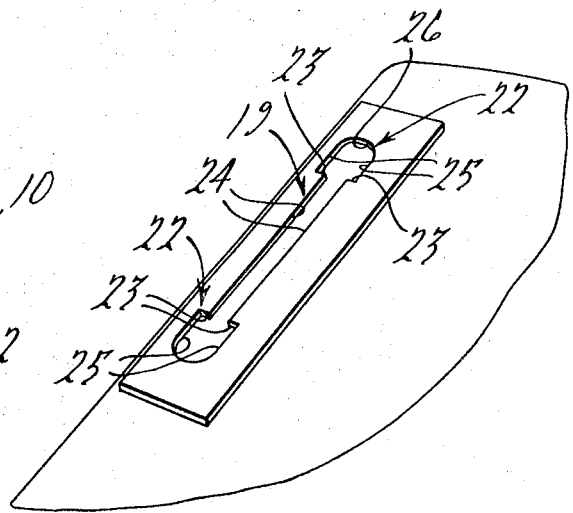
FIG. 2 is an enlarged perspective view of a part of the retractor housing having a slot with the anti-twist features as embodying the present invention.

Referring now to the drawing and more particularly to FIG. 1, numeral 10 denotes a housing or cover for a retractor mechanism (not visible) adapted to be concealed therewithin. The housing or cover 10 comprises an inverted shell having an angled top wall 11, a sloping front side 12, a rear side 13, and side panels 14 only one of which is visible. The open end of the housing is the bottom end. The housing or cover conceals a reel type retractor mechanism. The housing and the retractor mechanism concealed within it are adapted to be supported on a vehicle floor 15.

A webbing 16 of a seat belt segment is coupled to the retractor reel for protraction and retraction from the housing through an elongated slot 17 in the top wall of the housing. The slot 17 shown in FIG. 1 represents a conventional slot as found in many current production seat belt retractor housings or covers. It is a substantially rectangular opening having a width in a direction normal to its elongation substantially wider than the thickness of the webbing 16. In FIG. 1 the webbing is shown having a substantial twist in it. This occurs because the direction of pull on the belt segment frequently is at an oblique angle to the axis of rotation of the reel of the retractor mechanism, the reel being oriented so that the belt webbing will extend normal thereto in seat occupant restraint position. When pulled at an oblique angle, the webbing travels laterally of the reel and abuts the end edge 18 of the slot 17. This causes the webbing to coil or twist over itself. Frequently, the amount of twist or "roping" of the webbing is so great that upon release of the webbing it will not retract into the housing. In a common type of retractor mechanism once protracted the belt webbing cannot be again protracted until it is substantially retracted to release the reel locking mechanism. The inconvenience of untangling the roped webbing is obvious.

Referring now to FIGS. 2 to 5, inclusive, there is shown an improved retractor housing slot generally designated 19. The width of the slot 19 in a direction normal to its elongation is substantially less than that of the FIG. 1 slot 17, preferably not exceeding three times the thickness of the webbing passing through it. It will be recognized, however, that merely making the slot 19 narrower than the conventional slot 17 will not solve the binding or roping feature.

An important feature of the present invention is the provision of an anti-twist control means at the ends of the slot 19. This control means comprises enlargements in the form of apertures 22 located at the ends of the slot. Each aperture 22 has an edge wall 23 vertically intersecting a main edge 24 of the slot 19. Each aperture 22 has side edge walls 25 which terminate in a rounded end wall 26.

Figure 3:
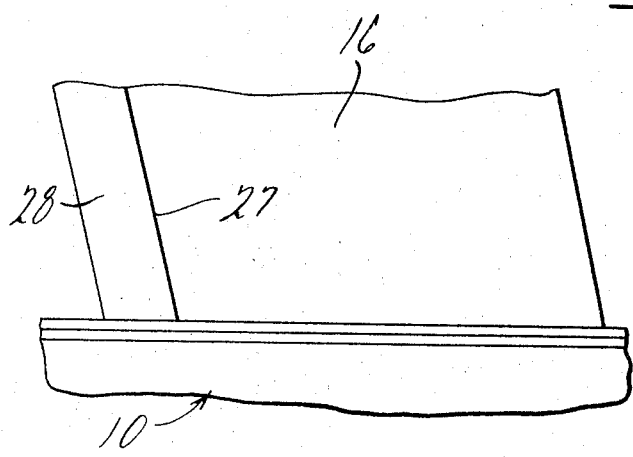
FIG. 3 is a fragmentary view illustrating the angle of exit of the protracted belt from the retractor housing.
Figure 5:
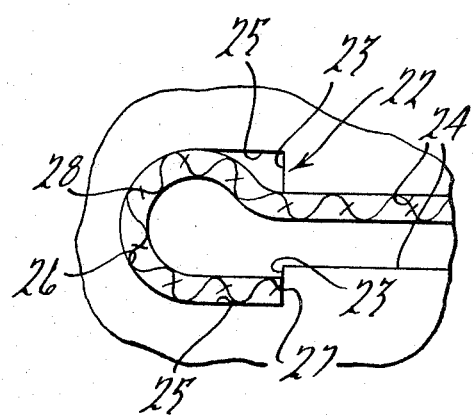
FIG. 5 is an enlarged view within the circle 5 of FIG. 4.
Figure 4:
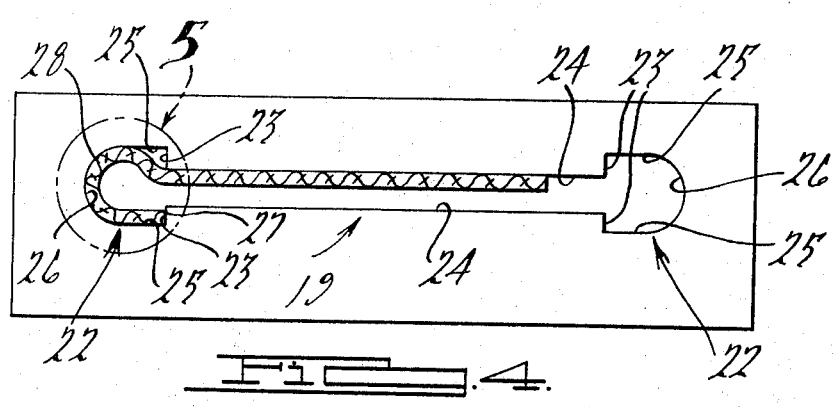
FIG. 4 is a plan view of FIG. 3.

In operation, as the webbing 16 is pulled out at an oblique angle, see FIG. 3, from the retractor housing 10, its side edge 27 feeds into an aperture 22 as a result of the lateral shift induced in the webbing as it comes off the retractor reel. The aperture 22 involved depends on the direction in which the webbing is obliquely pulled. As the side edge 27 abuts the rounded end wall 26 of the aperture 22, a coil 28 is induced in the marginal portion of the webbing. After formation of the coil 28, the direction of movement of the leading edge 27 of the webbing is back toward the slot 19. The edge 27 of the webbing 16 is limited in its return movement since, as best seen in FIG. 5, it abuts the vertical edge 25 of the aperture 22. When this happens, the vertical edge 25 functions as a stop means preventing further lateral movement of the webbing. The extent to which the coil 28 forms is insufficient to interfere with subsequent retraction of the webbing upon release of the seat belt system.

It is to be understood this invention is not limited to the exact construction illustrated and described above, but that various changes and modifications may be made without departing from the spirit and scope of the invention as defined by the following claims:

We claim:

1. A seat belt retractor housing having in a wall an elongated slot through which webbing of a seat belt segment coupled to a retractor within the housing may be protracted and retracted, the width of the slot in a direction normal to its elongation being slightly greater than the webbing thickness, the slot at each of its ends having an enlargement terminating in a rounded end wall, and stop means inwardly of a rounded end wall to prevent reverse entry of the webbing into the slot upon any lateral shift of the webbing into engagement with the respective end wall as the webbing is protracted and retracted.

2. A seat belt retractor housing according to claim 1, in which:

the width of the slot does not exceed three times the thickness of the webbing passing therethrough.

3. A seat belt retractor housing having in a top wall an elongated slot through which webbing of a seat belt segment coupled to a retractor within a housing may be protracted and retracted, the slot having a webbing anti-twist control means comprising at least one aperture appendaged to an end of the slot, the anti-twist control means aperture having an edge wall vertically intersecting a main edge of the slot and a rounded end wall spaced from the edge wall, the edge wall comprising a stop means preventing reverse entry of the webbing into the slot upon any lateral shift of the webbing causing the edge of the latter to coil upon itself upon the webbing engaging the rounded end wall as the webbing is protracted.

4. A seat belt retractor housing according to claim 3, in which:

a control means aperture is appendaged to each end of the elongated slot.

5. A seat belt retractor housing according to claim 4, in which:

the width of the slot in a direction normal to its elongation does not exceed three times the thickness of the webbing passing therethrough.

6. A seat belt retractor housing according to claim 3, in which:

the width of the slot in a direction normal to its elongation not exceeding three times the thickness of the webbing passing therethrough.

* * * * *